United States Patent [19]

Lablanche

[11] 3,830,542
[45] Aug. 20, 1974

[54] MOVABLE TAILGATE FOR A TRUCK

[75] Inventor: Jean Lablanche, Saint-Etienne, France

[73] Assignee: Bennes Marrel, Saint-Etienne (Loire), France

[22] Filed: Apr. 27, 1972

[21] Appl. No.: 248,267

[52] U.S. Cl. ................ 296/56, 49/324, 298/23 MD
[51] Int. Cl. ............................................. B60j 5/10
[58] Field of Search .................. 296/56; 105/261 A; 298/23 MD, 23 S; 49/324, 340

[56] References Cited
UNITED STATES PATENTS

| | | | |
|---|---|---|---|
| 1,221,112 | 4/1917 | Tubach | 105/261 A |
| 2,208,691 | 7/1940 | Voth | 296/56 X |
| 3,325,216 | 6/1967 | Boeck | 298/23 MD |
| 3,721,469 | 3/1973 | Senesac | 296/56 |
| 3,757,969 | 9/1973 | Smith | 296/56 X |

FOREIGN PATENTS OR APPLICATIONS

| | | | |
|---|---|---|---|
| 22,389 | 9/1947 | Finland | 296/56 |

*Primary Examiner*—David Schonberg
*Assistant Examiner*—John A. Pekar
*Attorney, Agent, or Firm*—Sughrue, Rothwell, Mion, Zinn & Macpeak

[57] ABSTRACT

A lorry has a tipping container closed by a tailgate mounted on two arms extending forwardly over the container. A forward end of each arm is mounted on a pin which pivots on a connecting arm pivotably mounted at one end on a second pin mounted on the side of the container. Pivotably mounted hydraulic jacks extend between the sides of the container and the regions at which the arms join the tailgate. Operation of the jacks lifts the tailgate substantially vertically for the other ends of the connecting arm to engage undersides of the arms and then the tailgate pivots outwardly about the second pin. In an alternative embodiment the first pin may be located in an elongated slot in a flange on the container side, this slot being inclined upwardly and rearwardly to allow the initial vertical lift of the tailgate.

5 Claims, 9 Drawing Figures

MOVABLE TAILGATE FOR A TRUCK

The present invention relates to a device for opening the tailgate of a tipping contained and the hydraulic control of this opening.

It is known that the tailgate of a tipping container generally opens upwards to allow the tipping of materials contained in the container. Nevertheless the opening of the tailgate must be very wide so as to not to retard the materials as they are tipped. But because of the weight of these materials the tailgate may tend to remain jammed against the container. The known system sometimes has another disadvantage due to the fact that the tailgate tends to open inopportunely under the weight of the materials.

An object of the invention is to avoid these disadvantages by providing an automatic opening device which guarantees reliable operation of the tailgate of a tipping container.

According to the invention there is provided a device in or for the opening tailgate of a tipping container comprising two upper lateral arms, rigidly mounted on the tailgate and extending forwards above the container, each of which arms pivots, by means facilitating a clearance of limited amplitude, on a first pin mounted on a corresponding upper edge of the container, and at least one hydraulic jack pivotally mounted on the upper edge of the container and on a region in which the corresponding arm is joined to the panel of the tailgate.

According to another feature of the invention the lower part of the panel of the tailgate is integral with a rigid transverse extension which, when the gate is closed, engages behind a fixed hook integral with a base of the container in the vicinity of the rear aperture of the container. An additional feature of the invention consists in providing the lower edge of the gate for this purpose with a longitudinal angle iron, one side of which protrudes downwards thus extending the plane of the tailgate.

According to a first e bodiment of the invention the means for pivoting each arm with clearance on the container comprises a connecting rod pivoted on the first pin supported by the receptacle then on a second pin supported by the arm, and the connecting arm is provided with an abutment boss for bearing against an abutment on the arm when the corresponding hydraulic jack is sufficiently elongated.

According to a second embodiment, the means for pivoting each arm with clearance comprises the first pin mounted on the arm, a flange mounted on the upper edge of the container, the flange being formed with an elongated aperture, and the first pin movably mounted in said aperture. The flange provided with the aperture may be integral with the container and the moving pin is integral with the arm.

The invention will now be further described with reference to the accompanying drawings illustrating non-limiting examples of the invention:

Figure 1:
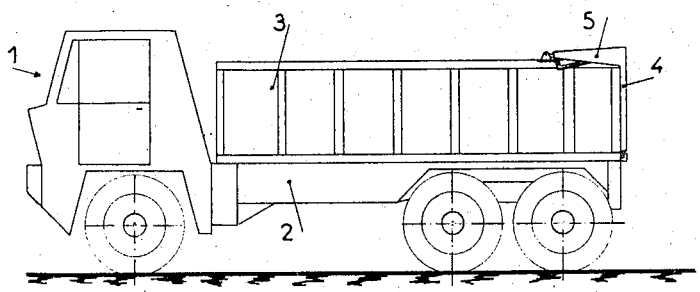
FIG 1 is a general view of a lorry having a tipping container provided with an opening tailgate formed according to the invention.

FIG. 1 shows a lorry 1 whose chassis 2 supports a tipping container 3 of known type. The lifting of this container is effected by any tilting mechanism of known type.

Figure 2:
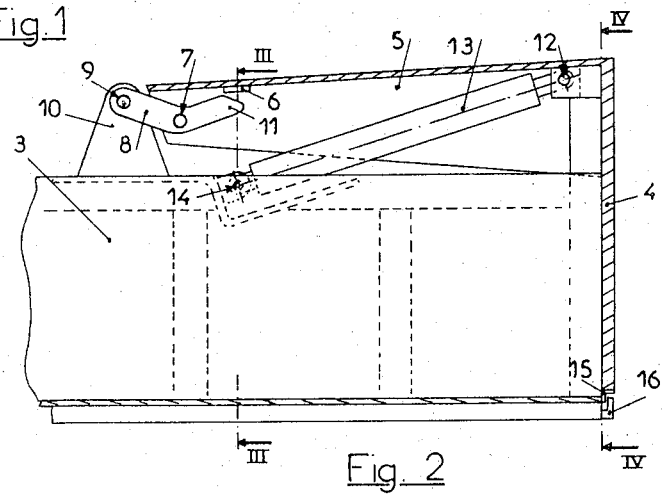
FIG. 2 is a fragmentary longitudinal section of the container in FIG. 1 showing a detail of the tailgate on a large scale.
Figure 3:
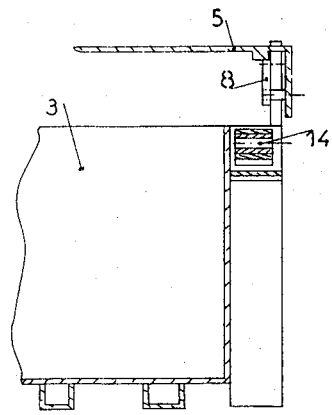
FIGS. 3 and 4 are sections on the line III—III and IV—IV (FIG. 2) respectively in FIG. 2.
Figure 4:
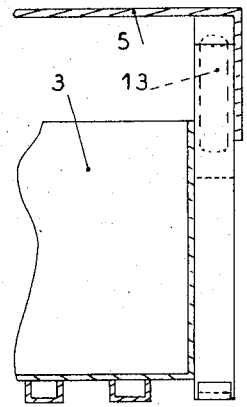

At the rear, the body of the container 3 is closed by a tailgate panel 4 which occupies a closed vertical position when the container is in the transporting position on the chassis 2 (FIGS. 1 and 2).

The tailgate 4 is provided at its rear with two lateral arms 5, each of these arms being pivoted on a corresponding upper edge of the container 3. In the following description, only the mechanism provided on one of the sides of the tailgate 4 will be described, it being understood that a symmetrical mechanism is provided on the other side.

The arm 5 illustrated in FIG. 2 is formed by an arrangement of sheet metal which has an internal abutment 6 provided on its upper face near to its forward end. In front of the abutment 6 and below it, the arm 5 supports a pin 7 on which a central part of a connecting rod 8 is pivoted. A front end of this connecting rod 8 is in turn pivoted via a pin 9 on a flange 10 integral with the edge of the container 3. The opposite end 11 of the connecting rod 8 comprises an abutment face or boss intended to come into contact with the abutment 6.

Finally a pin 12 is provided inside the arm 5 in the vicinity of the point where the arm joins the upper part of the tailgate 4. An hydraulic jack 13 connects this pin 12 to another pin 14 supported by the upper edge of the container 3.

In the stationary position, i.e., when the tailgate 4 is closed and the jack 13 is contracted, it can be seen in FIG. 2 that the pin 7 is located below the theoretical geometric line between the pins 9 and 12.

The lower edge of the tailgate 4 is provided with a transverse angle iron 15, the vertical, downwardly directed side of which may engage behind the stationary hooks 16 provided on the base of the container 3. The hooks 16 protrude towards the rear of the container and are turned upwards.

The operation is as follows:

From the closed position illustrated in FIGS. 1 and 2, the two jacks 13 are extended. This hydraulic control may take place manually, through the intermediary of a two-way valve.

Figure 5:
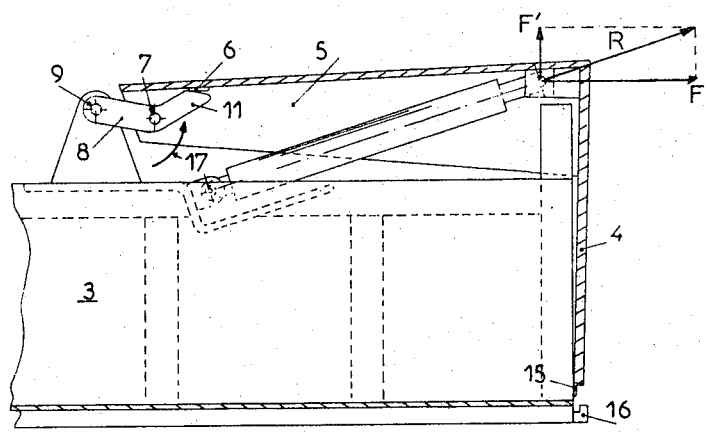
FIGS. 5 and 6 illustrate successive stages in the opening of the tailgate.
Figure 6:
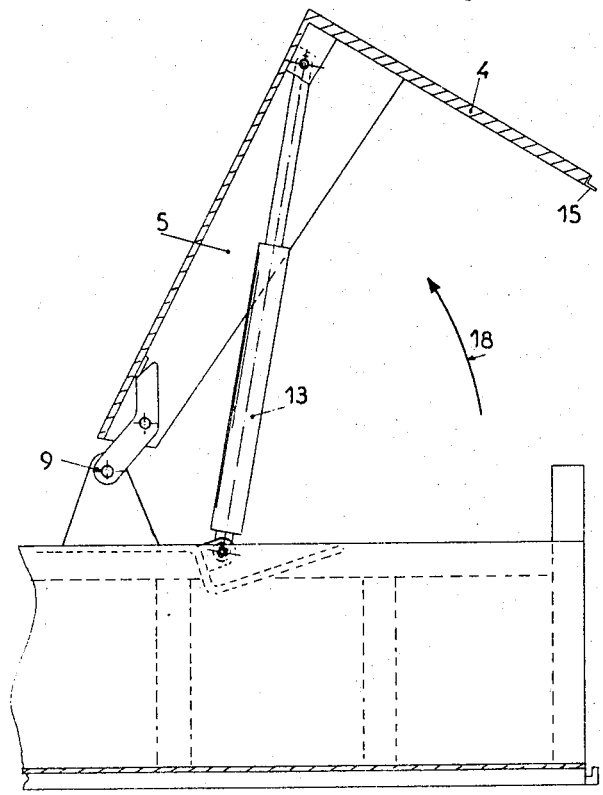

The thrust R developed by the jack 13 on the pin 12 may be resolved into a horizontal component F directed towards the rear (FIG. 5) and a vertical component $F^1$ directed upwards. The component F tends to move the tailgate 4 back, i.e. to move it away from the rear face of the container 3 so as to avoid it being jammed. The component $F^1$ tends to raise the tailgate 4 in order to remove the angle iron 15 from the hook 16. These two simultaneous movements of the tailgate 4 are facilitated by the movement of the connecting rod 8 which, firstly tilts about the fixed pin 9 in the direction indicated by arrow 17. During this movement, the three pins 9, 7 and 12 tend to come into alignment until the end 11 bears against the abutment 6. After this movement, the connecting rod 8 behaves as if it were rigidly integral with the arm 5, nevertheless the tailgate 4 pivots about the pins 9 (FIG. 6 arrow 18) until it is completely open.

The closing of the tailgate takes place in an inverse operation i.e. by retracting the jacks 13.

Figure 7:
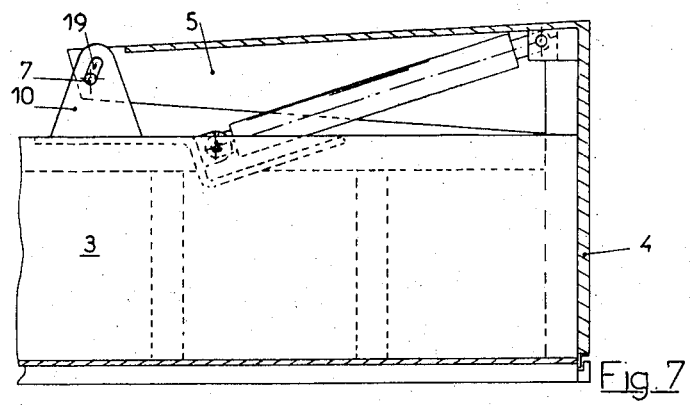
FIGS. 7, 8 and 9 are fragmentary longitudinal sections of a tipping container for a lorry provided with another embodiment of opening tailgate formed according to the invention shown in three different positions.
Figure 8:
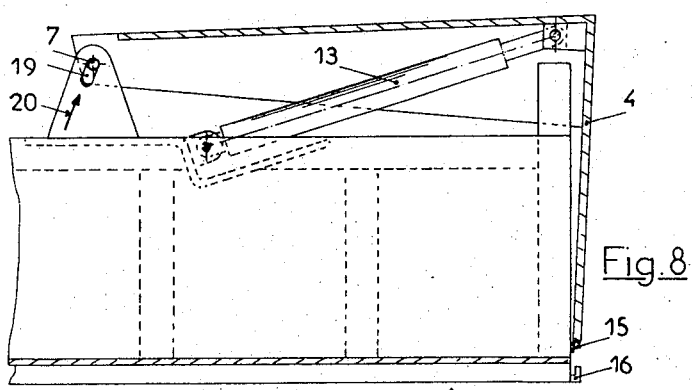
Figure 9:
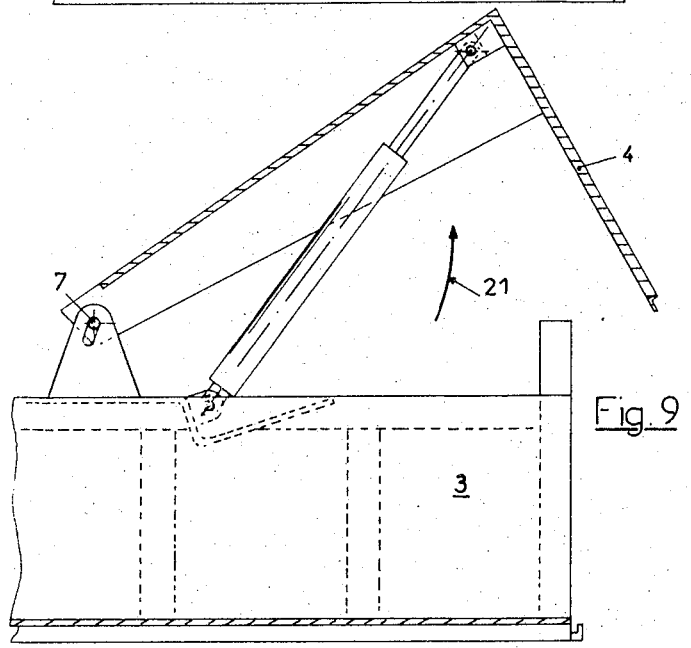

FIGS. 7 to 9 show another variation in which the pin 7 of each arm 5 is directly pivoted on the flange 10 of the container 3, by being mounted in an elongated aperture or button hole 19 cut in the flange 10. The orientation of each hole 19 corresponds to an upwards inclination in the direction of the rear of the container 3. Thus, when the tailgate 4 is closed (FIG. 7) each pin 7 is in abutment with the front lower end of its aperture 19.

When the jacks 13 are extended, each pin 7 begins to slide upwards (FIG. 8 arrow 20) in its button hole 19 which causes the previously described composite movement, tending simultaneously to move the tailgate 4 back and to raise its angle iron 15 above the locking hooks 16. At the end of this stage (FIG. 8) i.e. when the pins 7 are in abutment against rear upper edges of the holes 19 the pivoting of the tailgate nevertheless takes place in an upward direction (arrow 21) by pivoting about th pins 7 which remain stationary until it is completely open.

In any case, the arrangement according to the invention makes it possible to open the tailgate 4 wide, for example by an angle of rotation reaching 90°.

What is claimed is:

1. A tailgate device for a tipping container having upstanding sides and an open end comprising a tailgate for closing said open end, said tailgate having two arms rigidly mounted on the upper edge of said tailgate and extending forwardly above said container, lost motion pivot means for pivoting each of said arms to the upper edges of the sides of said container, at least one hydraulic jack pivotally mounted at one end on the upper edge of a side of said container and at the other end to the upper edge of said tailgate adjacent one of said arms and a transverse rigid extension on the lower edge of said tailgate which, when the tailgate is closed, engages behind a fixed hook integral with the base of the container in the vicinity of the opened end of the container whereby upon initial elongation of said jack the upper edge of said tailgate will be separated from the sides of said container as a result of said lost motion pivot means to prevent jamming of the tailgate during the subsequent raising of the tailgate upon further elongation of said jack.

2. A tailgate device as set forth in claim 1 wherein said extension is comprised of a longitudinal angle iron secured to the bottom edge of said tailgate with one side thereof protruding downwardly in the plane of the tailgate.

3. A tailgate device as set forth in claim 1 wherein said lost motion pivot means for pivoting each arm comprises a connecting rod pivotally mounted on a first pin supported by said container and on a second pin supported by said arm, said connecting rod being provided with an abutment extending beyond said second pin, said arm having an abutment operatively disposed in spaced relation to aid connecting rod abutment when said tailgate is closed but which bears against said connecting rod abutment when said jack said sufficiently extended.

4. A tailgate device as set forth in claim 1 wherein said lost motion pivot means for pivoting each arm comprises a pin mounted on said arm, a flange mounted on the upper edge of a side of said container, said flange being formed with an elongated aperture with said pin movably mounted in said aperture.

5. A tailgate device as set forth in claim 4 wherein said flange is integral with said container and said pin is integral with said arm.

* * * * *